United States Patent
Loomis

(10) Patent No.: US 10,330,479 B2
(45) Date of Patent: Jun. 25, 2019

(54) VEHICLE NAVIGATION BY DEAD RECKONING AND GNSS-AIDED MAP-MATCHING

(71) Applicant: Trimble Inc., Sunnyvale, CA (US)

(72) Inventor: Peter Loomis, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 221 days.

(21) Appl. No.: 15/270,299

(22) Filed: Sep. 20, 2016

(65) Prior Publication Data

US 2018/0080775 A1  Mar. 22, 2018

(51) Int. Cl.
*G01C 21/30* (2006.01)
*G01C 21/16* (2006.01)

(52) U.S. Cl.
CPC ........... *G01C 21/30* (2013.01); *G01C 21/165* (2013.01)

(58) Field of Classification Search
None
See application file for complete search history.

(56) References Cited

U.S. PATENT DOCUMENTS

| 6,502,033 B1 * | 12/2002 | Phuyal | G01C 21/30 340/988 |
| 7,756,639 B2 * | 7/2010 | Colley | G01S 19/05 701/446 |
| 9,222,800 B1 * | 12/2015 | Scherer | G01C 23/005 |
| 9,587,951 B1 * | 3/2017 | Hamida | G01C 21/32 |
| 2013/0151146 A1 * | 6/2013 | Syed | G01C 21/30 701/446 |
| 2016/0146616 A1 | 5/2016 | Ren | |
| 2017/0123434 A1 * | 5/2017 | Urano | B60Q 9/008 |

FOREIGN PATENT DOCUMENTS

| WO | 02/39063 A1 | 5/2002 |
| WO | 2018/057425 A1 | 3/2018 |

OTHER PUBLICATIONS

International Search Report and Written Opinion for Application No. PCT/US2017/051816, 16 pages.

* cited by examiner

*Primary Examiner* — Mussa A Shaawat
*Assistant Examiner* — Abdhesh K Jha
(74) *Attorney, Agent, or Firm* — Kilpatrick Townsend & Stockton LLP

(57) ABSTRACT

Dead reckoning combined with GNSS-aided map-matching improves accuracy and reliability of vehicle navigation. A map-match navigation module in a handheld device sends map-match feedback messages to a vehicle state estimator via a port. The module also accepts vehicle speed and inertial navigation data from sensors mounted in the vehicle.

24 Claims, 6 Drawing Sheets

VEHICLE NAVIGATION BY DEAD RECKONING AND GNSS-AIDED MAP-MATCHING

TECHNICAL

The disclosure is related to vehicle navigation systems.

BACKGROUND

Car navigation systems have quickly become essential driving tools. Armed with a destination address, knowing where one is or what road to take are no longer necessary. Just follow the automated directions displayed or spoken by the navigation system.

Conventional car navigation systems are based on global navigational satellite system (GNSS) receivers coupled with digital map systems. As good as these systems are, there is always room for improvement.

What is needed is ever more accurate and reliable car navigation.

DETAILED DESCRIPTION

Vehicle navigation by dead reckoning (DR) and GNSS-aided map-matching is an advanced navigation system and technique for cars. (In this disclosure "car" or "vehicle" refers to any vehicle commonly found on roadways including passenger cars, light trucks, buses, tractor-trailers, etc.) The system includes navigation sensors, a state estimator, and a map-match navigation module. A display and/or user interface may also be included, as may provisions for the system to accept data input, such as map updates and real-time traffic information.

The system takes advantage of the capabilities of both in-car, permanently-mounted components and handheld devices such as smart phones and tablets. Choices of where to implement various system functions are not arbitrary; in fact, such choices affect system accuracy and reliability. Unlike conventional GNSS-plus-digital-map systems, the present system integrates dead reckoning data into map-matching, and it provides feedback to a state estimator from a map-match module in a handheld device.

DR and GNSS-aided map-matching with map-match feedback makes vehicle navigation more accurate in difficult cases such as: spiral parking garage ramps, environments where GNSS signal reception is degraded, lane-change maneuvers, tunnels and construction zones, as examples. Map match feedback helps a navigation system recover from heading errors, for example. Maintaining good performance in troublesome situations leads to higher overall reliability and driver satisfaction.

Figure 1:
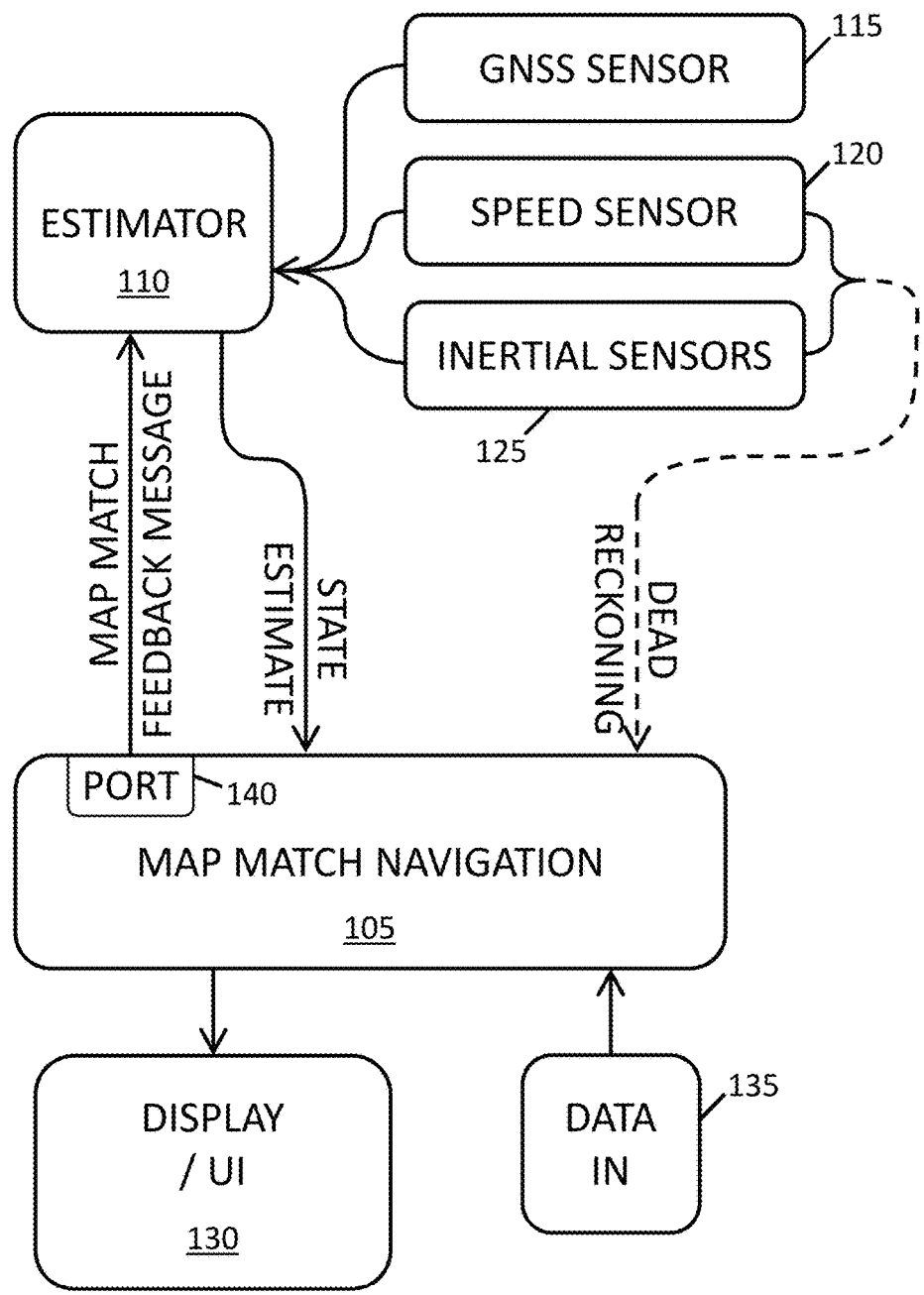
FIG. 1 is a diagram of a dead reckoning and GNSS-aided map-matching navigation system.

FIG. 1 is a diagram of a dead reckoning and GNSS-aided map-matching navigation system. In FIG. 1, map match navigation module 105 is a subsystem that chooses a road from a database given a state estimate and/or dead reckoning data. Map match tries to clean up position estimates by estimating how likely a vehicle is to be travelling on a known roadway.

As an example of map matching, suppose a GNSS receiver estimates that a car is travelling eastbound at 70 miles per hour in the grass median of an interstate highway. A map match module takes that information and returns an estimate that the car is probably in an eastbound lane of the highway, rather than in the median. The map match module may also estimate that the car is possibly (although not as likely) on a parallel service road where the speed limit is only 25 miles per hour.

Estimator 110 combines GNSS position and velocity estimates, vehicle speed estimates and inertial sensor data to produce a maximum likelihood estimate of a state vector including a car's position, heading, and covariances of position and heading. Estimator 110 includes a recursive Bayesian estimator running on a microprocessor. The recursive Bayesian estimator may be a Kalman filter, extended Kalman Filter, unscented Kalman Filter, multivariate moving window filter, or particle filter, as examples.

GNSS sensor 115 includes a GNSS receiver and its antenna. The GNSS sensor sends GNSS-based position and velocity estimates to estimator 110. Alternatively, the GNSS sensor may also (or instead) send satellite pseudoranges, Doppler information, signal quality, carrier phase, orbit data and/or ionospheric corrections. The receiver is most often implemented as a custom integrated circuit chip or multi-chip assembly. Speed sensor 120 uses wheel or shaft rotation data to determine vehicle speed and whether the vehicle is in forward or reverse gear. Speed sensor 120 may be implemented as a transmission output shaft speed (TOSS) sensor, for example. Speed data is available on modern vehicles' controller area network (CAN bus). Inertial sensors 125 include micro-electromechanical (MEMS) accelerometers and MEMS gyroscopes.

Display and/or user interface 130 provides navigation output to a driver or other user. The output may be in the form of a digital moving map display and/or synthesized, spoken navigation instructions. ("In 300 feet, turn right onto Stewart Drive.") Finally, "data-in" module 135 provides a channel to supply data such as map updates and real-time traffic to map match navigation module 105. The data-in module may include provisions for obtaining data over-the-air from satellites, cell towers, or wireless local area network access points (Wi-Fi). Alternatively, data-in may be provided by universal serial bus or similar ports, or by a secure digital memory card reader or similar device.

Speed sensor 120 is necessarily a component installed in a vehicle. Inertial sensors (i.e. accelerometers and gyroscopes) 125 are preferably installed in a vehicle. That way measured accelerations and rotation rates directly reflect vehicle motion. Alternatively, inertial sensors in a handheld device may be used, but the higher dynamics of the movement typical of a handheld device introduce additional sources of error. It's harder to keep track of the motion of a car with a sensor that is free to move around in the car than it is with a sensor that is fixed to the car.

GNSS sensor 115 is preferably installed in a vehicle because a vehicle-mounted, external GNSS antenna usually has a much better view of GNSS satellites than a handheld device inside a car does. Alternatively, a GNSS sensor in a handheld device may be used, but the likely lower quality received signal may lead to less accurate or less precise GNSS position estimates when compared with estimates from an installed system with an unobstructed antenna.

Estimator 110 may be implemented in a microprocessor installed in a vehicle or in a microprocessor in a handheld device. Estimator 110 must be provided with enough processing power to perform calculations associated with a recursive Bayesian filter and it must be provided with enough input/output bandwidth to receive sensor data and map match feedback messages and also provide state estimates to the map match navigation module.

Map match navigation module 105 is preferably implemented in a handheld device such as a smart phone or tablet. Map match navigation does not need any special hardware in a handheld device; it runs as an app. However, the map match navigation module must provide feedback, via map match feedback messages, to estimator 110. The map match navigation module sends map match feedback messages to the estimator via port 140.

Port 140 enforces a map-match feedback message format and protocol for communication between the module and the estimator. The port's standardized message format and protocol means that designers of estimator 110 need to know only what kind of feedback messages to expect and nothing about the internal workings of the map match module.

When map match navigation is implemented in a handheld device it is easier to keep map data and real-time traffic data up-to-date since the capabilities of data-in module 135 (e.g. cellular data, Wi-Fi, etc.) are usually included in smart phones, tablets and the like. Similarly, display/user interface 130 is preferably implemented in a handheld device since smart phones and tablets already include displays, microphones, speakers, speech recognition and speech synthesizer capabilities and other user interface devices.

Speed sensor 120 and inertial sensors 125 send dead reckoning data to estimator 110. Speed sensor 120 and inertial sensors 125 may also send dead reckoning data directly to map match navigation module 105. The dead reckoning data may include whether a car is travelling forward or in reverse, vehicle speed as estimated from wheel rotation data, acceleration estimates and rotation rate estimates.

Estimator 110 produces a state estimate and sends it to map match module 105. The state estimate includes a maximum likelihood estimate of a car's position (x, y, z) and heading. The state estimate also includes position and heading covariances, and accelerometer and gyroscope biases. Estimator 110 may send a complete state estimate to map match 105 or it may only send a subset of the state estimate. The state estimate may include speed sensor and inertial sensor data. Alternatively, the speed sensor and inertial sensors may send data directly to map match 105. (The "DEAD RECKONING" arrow connecting the sensors to the map match module is drawn dashed to indicate these possibilities.)

Map match module 105 chooses a road that a car is most likely travelling on based on the state estimate provided by estimator 110 and/or speed and inertial data provided by sensors 120 and 125. A map match feedback message is provided via port 140. The map match feedback message includes the position (x, y, z) and heading of the road that a car is most likely travelling on. The feedback message also includes position and heading variances.

The map match feedback message may also include additional information. For example, the feedback message may include the snap distance from a car's position reported in a state estimate to a most-likely road. (Snap distance from a point to a line is the distance from the point to the nearest point on the line.) The feedback message may include the elevation of the most-likely road and the estimated probability of a chosen, most-likely road being the correct road; i.e. an estimate of confidence in the road choice.

The map match feedback message may also include a second-choice road and an estimate of the probability of the second-choice road being the correct road. In the example given above map match might estimate that the probability of the car being in an eastbound lane of the highway is 85%, the probability of the car being on the parallel access road is 12%, and the probability of the car being somewhere else is 3%, for example.

Variances provided in the map match feedback message may be computed from a variety of data such as the width of the road in question, the average road heading, the length of a snap distance vector and road choice probabilities. In addition, the map match feedback message may contain flags or Boolean information such as whether or not the car is in a tunnel, in a construction zone or not on a road. This Boolean information may be used to adjust position variances.

Position and heading data in the map match feedback message is treated by the estimator like an additional sensor measurement and position and heading variances are treated like sensor variances. The estimator generates a more accurate state estimate when taking into account data in the map match feedback message than without it. For example, the estimator may update sensor bias estimates based on information in the map-match feedback messages.

Figure 2:
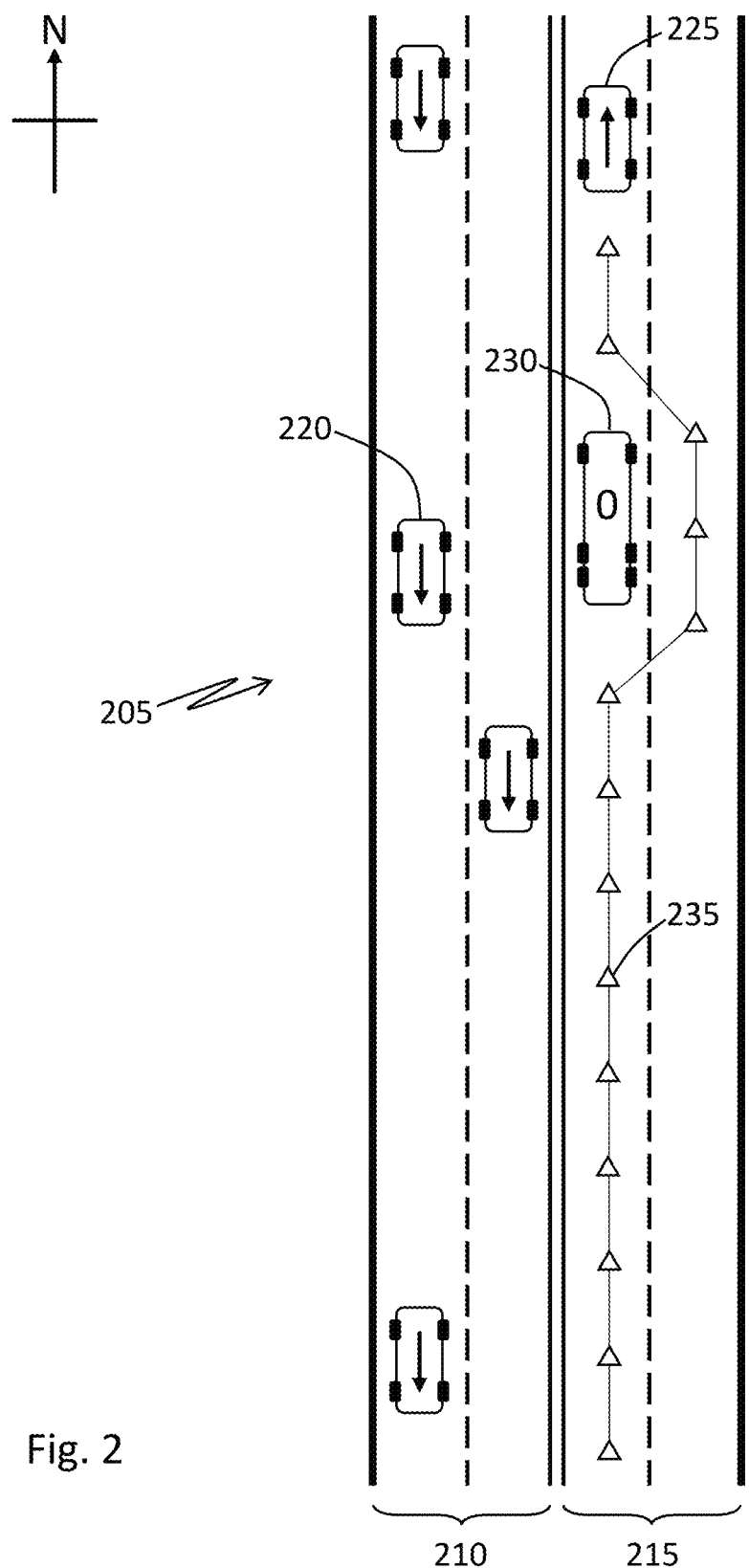
FIG. 2 is a diagram of a car navigation scenario involving a lane-change maneuver.

Operation and further details of dead reckoning (DR) and GNSS-aided map-matching for vehicle navigation are now described in connection with FIGS. 2-6. FIG. 2 is a diagram of a car navigation scenario involving a lane-change maneuver. In FIG. 2, north-south road 205 has two southbound lanes 210 and two northbound lanes 215. Cars (e.g. 220, 225) travel in the lanes in the direction of arrows drawn on them. Bus 230 is stopped in one of the northbound lanes. A series of triangles connected by line segments (e.g. 235) depict the position history of car 225 as estimated by GNSS. Car 225 started out in the same lane as bus 230, but switched lanes briefly to avoid the bus.

This lane-change scenario is both common and problematic. A problem arises because during the lane change, the road that the car is on does not change. However, the car's heading changes as it moves from one lane to another. A conventional map match system does not vary its output during the lane change maneuver and the estimator may therefore incorrectly interpret the heading change as a change in gyroscope calibration.

In the system of FIG. 1, however, map match navigation module 105 accumulates a recent history of vehicle speed, heading changes, and sensor biases. Given the car's history driving straight up one lane as it approaches the bus, the map match navigation module correctly interprets the heading change and keeps estimating that the car is on the road even though its heading briefly diverges from the road's heading.

The history of speed and heading changes is accumulated by the map match module from speed, gyroscope and/or accelerometer data from the speed and inertial sensors. Inferior methods might rely on speed and heading change estimates obtained by taking differences of successive position estimates from estimator 110. Differencing recursive Bayesian filter estimates does not lead to good results, however, because such estimates can change abruptly even when the actual state of the system changes smoothly.

Gyroscope data is subject to bias. However, gyro bias changes slowly, so map match module 105 makes use of gyro bias estimates (part of the state estimate) to correct gyro data.

Figure 3:
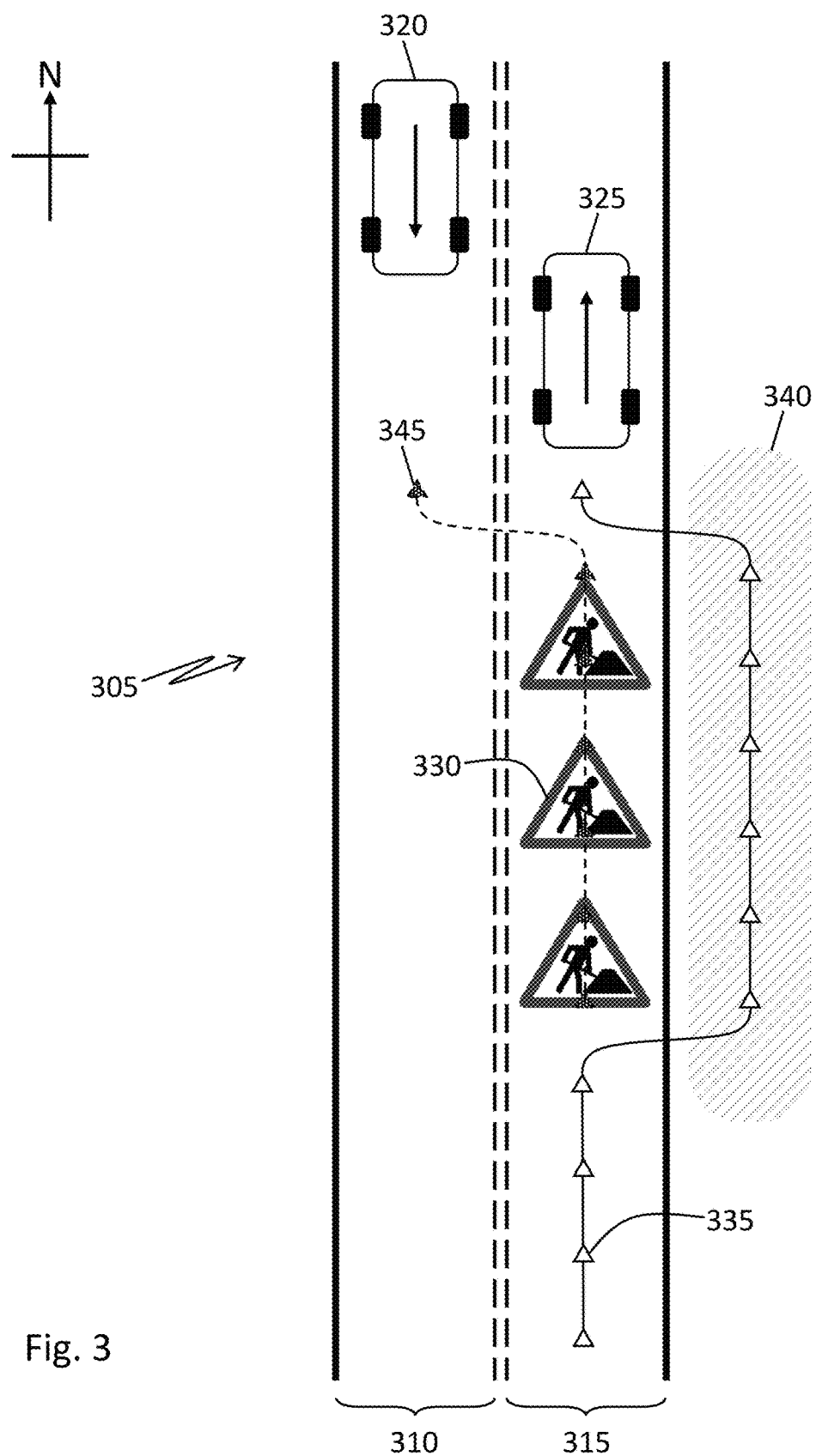
FIG. 3 is a diagram of a car navigation scenario involving leaving a roadway to avoid a construction zone.

A similar example is shown in FIG. 3 which is a diagram of a car navigation scenario involving leaving a roadway to avoid a construction zone. In FIG. 3, north-south road 305 has one southbound lane 310 and one northbound lane 315. Cars 320 and 325 travel in the direction of arrows drawn on them. Road construction signs, e.g. 330, indicate a section of lane 315 that is blocked by road construction. A series of open triangles, e.g. 335, connected by solid curves depict the position history of car 325 as estimated by GNSS. Off-road area 340 is not part of road 305, but is traversed by vehicles avoiding the road construction. A series of shaded triangles, e.g. 345, connected by dashed curves depict an incorrect position history of car 325. Car 325 started out in lane 315, but had to traverse off-road area 340 to avoid road construction.

A conventional map match navigation system misinterprets car 325's excursion off road. Conventional map match assumes that off-road travel is unlikely. Therefore when such a system encounters the situation illustrated in FIG. 3, it misinterprets car 325's maneuver to rejoin the road after the construction zone, and estimates that car 325 is at the position of shaded triangle 345, travelling the wrong direction in lane 310.

In the system of FIG. 1, however, map match navigation module 105 accumulates a recent history of vehicle speed, heading changes and sensor biases. The accumulated history may represent the most recent 100 seconds of vehicle motion (i.e. not including stand still time), for example. (Vehicle history as short as the most recent 10 seconds of vehicle motion or as long as the most recent 1000 seconds of vehicle motion may be useful.)

Map match navigation module 105 may also receive construction zone updates via its data-in facilities and/or may send an off-road Boolean flag to estimator 110. The estimator may interpret an off-road flag as a signal to adjust variances associated with data in the map match feedback message. (Another useful Boolean flag is one that indicates a car is in a tunnel, as tunnel maps are often inaccurate, implying that greater position variances are justified.)

Map match navigation module 105 may receive a construction zone update via its data-in facilities 135. Similarly the module may receive other kinds of map updates such as new or changed routes, or data on traffic jams or accidents. Such updates reduce map match errors.

Map match module may also use an accumulated a recent history of vehicle speed, heading changes, and sensor biases to fit a car's track to a map. In the scenario of FIG. 3, for example, the module may fit a history of car 325 traveling in northbound lane 315 to the shape of that lane on a map. In this case car 325 travels straight north for a while before encountering the construction zone. If map match module has a history of heading change data that is consistent with the car not changing direction, then it can match the straight road with the straight driving history and compute gyro biases if necessary. Alternatively, the map match module may receive computed gyro bias estimates from estimator 110 and apply them to gyro data from inertial sensor unit 125.

Figure 4:
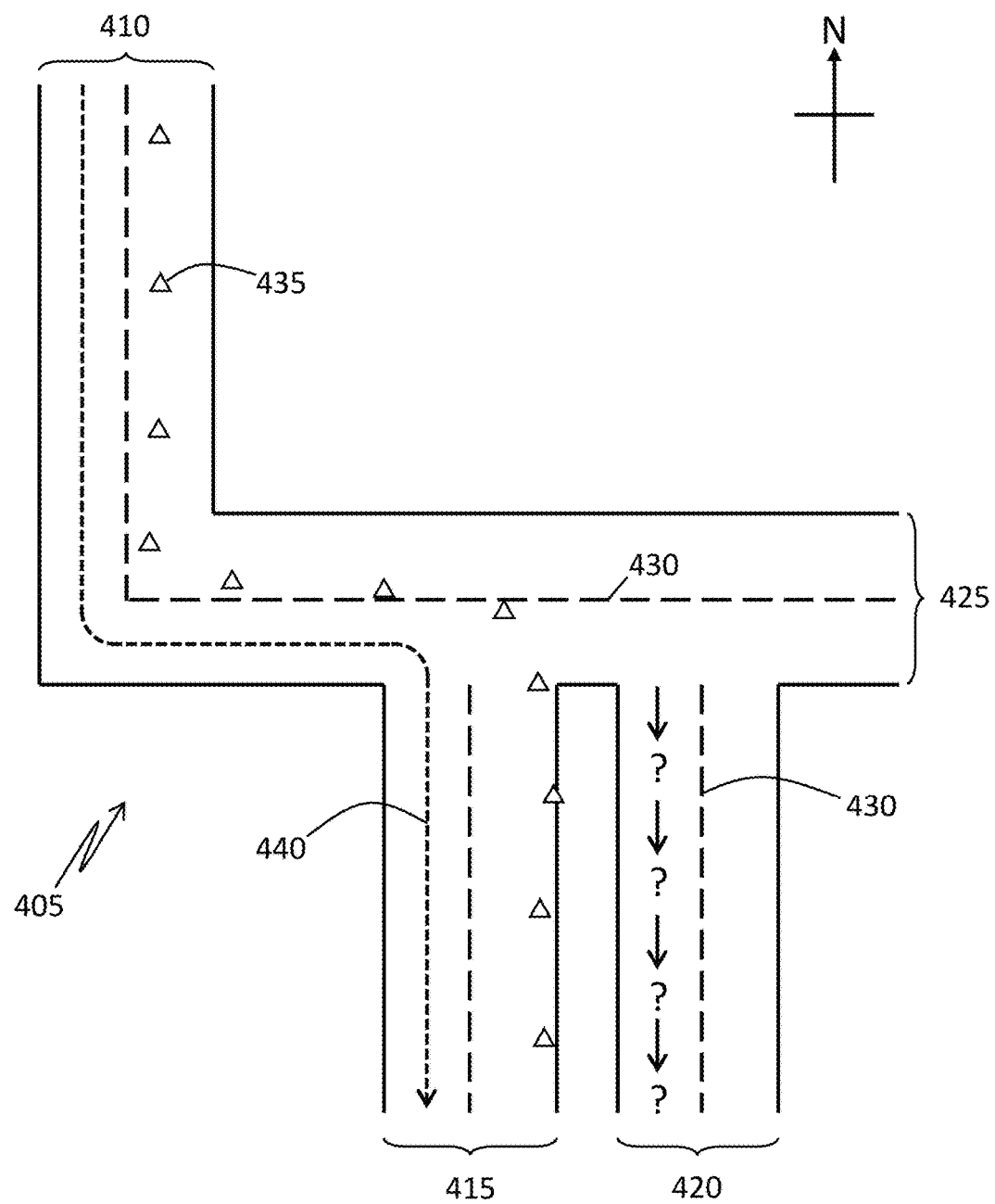
FIG. 4 is a diagram of a car's path along roads with GNSS position data overlaid.
Figure 5:
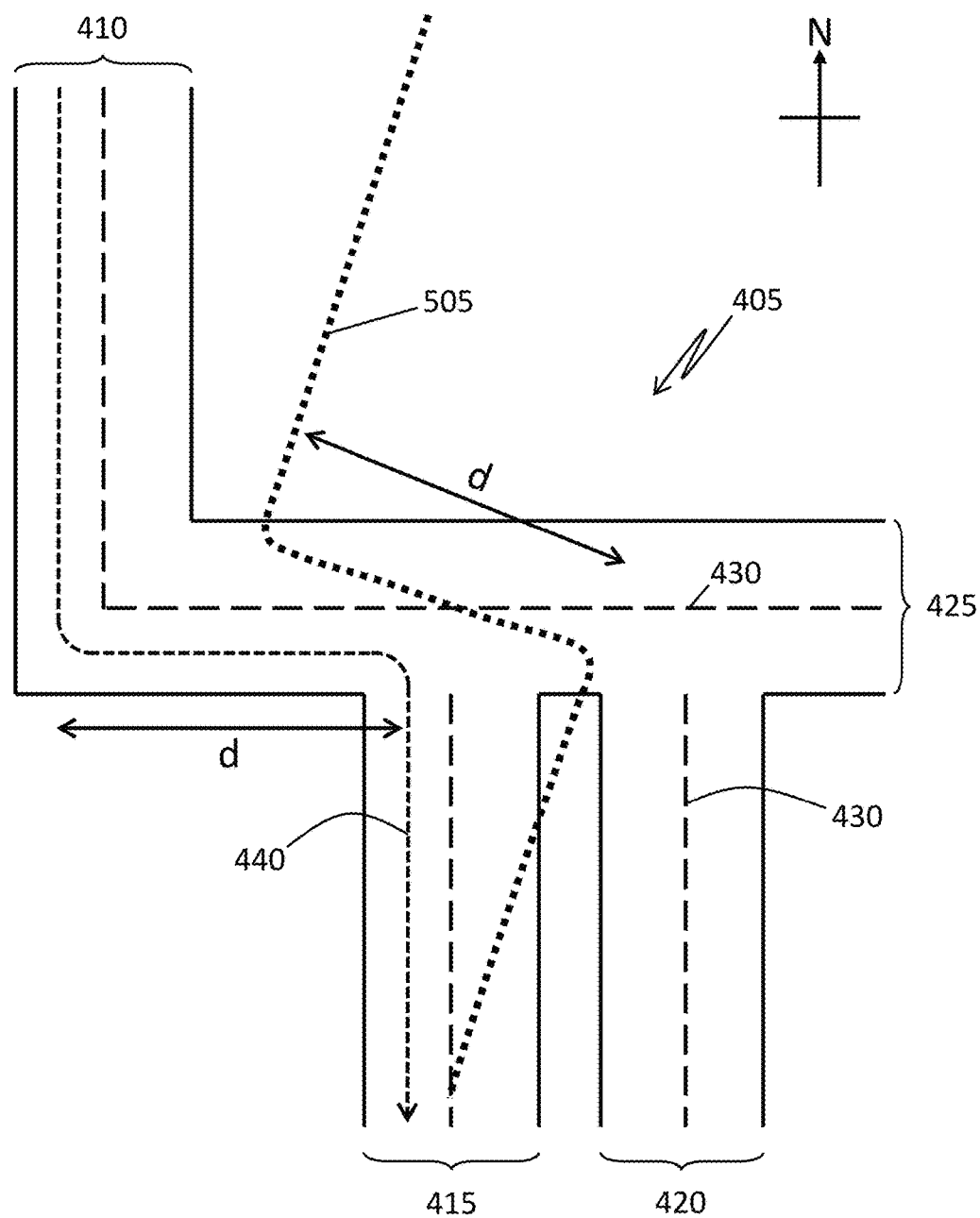
FIG. 5 is a diagram of a dead reckoning track associated with the car's path in FIG. 4.

FIGS. 4 and 5 provide an example of how map match navigation module 105 uses curve fitting and sensor bias estimates to improve map match accuracy. FIG. 4 is a diagram of a car's path along roads with GNSS position data overlaid. FIG. 5 is a diagram of a dead reckoning track associated with the car's path in FIG. 4.

FIGS. 4 and 5 show a map 405 of roads 410, 415, 420 and 425. Each of these roads has two lanes divided by a dashed line 430. Open triangles, e.g. 435, represent GNSS position estimates of a car (not shown) that travels south along road 410, turns east along road 425, and then turns south along road 415. Dashed line 440 represents the actual or true path of the car.

FIG. 4 shows GNSS position estimates that are near, but not coincident with the car's true path. This is typical because GNSS is not perfectly accurate. Random noise, multipath effects, signal obstructions, atmospheric phenomena and other effects can all degrade GNSS accuracy. The GNSS position estimates on road 410 are likely close enough to allow a map match module to correctly position a southbound car in the southbound lane of the road. The GNSS position estimates on road 415 are not sufficient, however. Some of the position estimates on road 415 are closer to the southbound lane of road 420 than to the southbound lane of road 415. A conventional map match system may justifiably, but incorrectly, estimate that the car's true position is on road 420, in the southbound lane marked with arrows and question marks, since that is the closest road to the GNSS estimate.

Map match navigation module 105 avoids this error by shape fitting a recent history of car heading changes and speed, as estimated by inertial sensors, to its map. FIG. 5 shows the same road features as FIG. 4. GNSS estimates 435 are not shown in FIG. 5. Instead car track history 505, as estimated based on inertial data, is shown. Track 505 is a best estimate of the history of a car's position as determined from accelerometers and gyroscopes. Accelerometer and gyro biases have caused estimated track 505 to be displaced eastward and rotated clockwise compared to the true track 440.

Map match navigation module 105 fits estimated track 505 to road layout 405 to arrive at the correct estimate that the car traveled on road 415, not 420. Fitting the track to the map layout may involve searching among varying degrees of rotation to account for gyroscope bias and/or searching among varying degrees of translation to account for accelerometer bias. In the situation shown in FIG. 5 a westward shift and counterclockwise rotation of estimated track 505 make it fit the road layout. Furthermore, distance "d" is consistent with a right turn from road 425 onto road 415, not 420.

Alternatively, map match module 105 may receive bias estimates as part of an estimated state vector from estimator 110. Since sensor biases change slowly, estimated bias at the current time can be propagated backward in time to correct accumulated sensor data. This leads to an inertial-sensor-based track estimate that is close to the actual track.

None of this means that GNSS is unnecessary. On the contrary, GNSS position estimates are measurements used by a recursive Bayesian filter in estimator 110. In particular, GNSS and speed sensor measurements permit the recursive Bayesian filter to estimate inertial sensor biases.

Figure 6A:
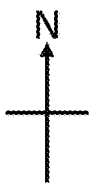
FIG. 6A is a diagram of a highway exit ramp.
Figure 6A:
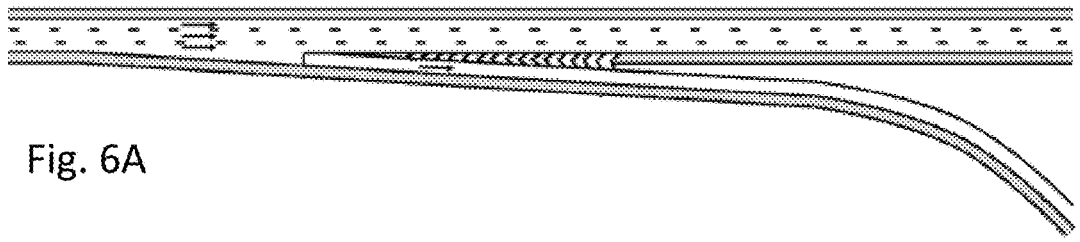
Figure 6B:
FIG. 6B is a diagram of a car's path along the exit ramp as estimated by map matching.
Figure 6C:
FIG. 6C is a diagram of a car's path along the exit ramp as estimated by dead reckoning.

FIGS. 6A, 6B and 6C show a diagram of a highway exit ramp, a diagram of a car's path along the exit ramp as estimated by map matching, and a diagram of a car's path along the exit ramp as estimated by dead reckoning, respectively. An exit ramp is a common situation and one that can be problematic for conventional map matching. A car's heading may only change slightly as it takes a long exit ramp and its slowing speed is not necessarily an indication of leaving a highway—the car may have slowed down for traffic. Conventional map matching may therefore show the car as staying on the highway for a significant distance even after it has taken the exit. This straight-line (assuming a straight highway as in FIG. 6A) path is shown in FIG. 6B.

Gyroscopes, while subject to bias and drift, produce much higher update rates and smoother output than GNSS or estimator outputs. The shape of a car's track as it takes the exit ramp of FIG. 6A is shown in FIG. 6C. This shape is characterized by small, smooth heading changes that are detected by a gyroscope. As mentioned in connection with FIG. 5, a gyroscope's output may need bias correction, but gyro bias estimates may be computed by fitting a path history to a map, or obtained in the output of estimator 110.

Vehicle navigation by dead reckoning (DR) and GNSS-aided map-matching provides improved car navigation performance in different ways. A map match navigation module that accepts inertial and speed sensor input can fit a vehicle's recent speed and heading change history to a map to obtain a reliable most-likely-road prediction and confidence estimate. A map match navigation module, in a handheld device, that sends map match feedback messages to an estimator via a port improves the capability of the estimator to deal with problematic situations such as true off-road excursions and tunnels.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A vehicle dead reckoning and GNSS-aided map-matching navigation system comprising:
   a map-match navigation module in a handheld device, the module configured to:
      send map-match feedback messages to an estimator via a port, the map-match feedback messages including a position, a heading, a position variance and a heading variance of a vehicle estimated based on at least one of a road width, an average road heading, a length of a snap distance, or road choice probabilities, the port enforcing a map-match feedback message format and protocol for communication between the map-match navigation module and the estimator;
      receive vehicle state estimates from the estimator, the estimator including a recursive Bayesian filter that computes an estimated position and an estimated heading of the vehicle based on: GNSS position estimates, estimates of the vehicle's speed from a speed sensor, inertial navigation estimates from inertial sensors, and the map-match feedback messages received via the port including the position variance and the heading variance, wherein the vehicle state estimates include the estimated position and the estimated heading of the vehicle, and the estimates of the vehicle's speed;
      receive map updates;
      accumulate a recent history of changes of the vehicle's speed and heading based on the estimates of the vehicle's speed and the estimated heading of the vehicle;
      estimate an updated position and an updated heading of the vehicle based on the estimated position and the estimated heading of the vehicle, the recent history of the changes of the vehicle's speed and heading, and map data; and
      send the updated position and the updated heading of the vehicle to a user interface device.

2. The system of claim 1, the estimator being mounted in the vehicle.

3. The system of claim 1, the estimator being included in the handheld device.

4. The system of claim 1, the map-match navigation module further configured to receive the estimates of the vehicle's speed from the speed sensor.

5. The system of claim 4, the speed sensor being mounted in the vehicle.

6. The system of claim 1, the map-match navigation module further configured to receive inertial navigation estimates from the inertial sensors.

7. The system of claim 6, the inertial sensors being mounted in the vehicle.

8. The system of claim 1, the map-match navigation module further configured to accumulate a track of the vehicle's recent positions.

9. The system of claim 8, the map-match navigation module further configured to fit the track to the map data to estimate the vehicle's position.

10. The system of claim 1, the map-match feedback messages further including the snap distance from the position of the vehicle to a nearest road.

11. The system of claim 1, the map-match feedback messages further including Boolean flags to indicate when the vehicle is in a tunnel or not on a road.

12. The system of claim 1, the estimator updating sensor bias estimates based on information in the map-match feedback messages.

13. A vehicle dead reckoning and GNSS-aided map-matching navigation method comprising, using a map-match navigation module in a handheld device:
   sending map-match feedback messages to an estimator via a port, the map-match feedback messages including a position, a heading, a position variance and a heading variance of a vehicle estimated based on at least one of a road width, an average road heading, a length of a snap distance, or road choice probabilities, the port enforcing a map-match feedback message format and protocol for communication between the map-match navigation module and the estimator;
   receiving vehicle state estimates from the estimator, the estimator including a recursive Bayesian filter that computes an estimated position and an estimated heading of the vehicle based on: GNSS position estimates, estimates of the vehicle's speed from a speed sensor, inertial navigation estimates from inertial sensors, and the map-match feedback messages received via the port including the position variance and the heading variance, wherein the vehicle state estimates include the estimated position and the estimated heading of the vehicle, and the estimates of the vehicle's speed;
   receiving map updates;
   accumulating a recent history of changes in the vehicle's speed and heading based on the estimates of the vehicle's speed and the estimated heading of the vehicle;

estimating an updated position and an updated heading of the vehicle based on the estimated position and the estimated heading of the vehicle, the recent history of the changes in the vehicle's speed and heading, and map data; and sending the updated position and the updated heading of the vehicle to a user interface device.

14. The method of claim 13, the estimator being mounted in the vehicle.

15. The method of claim 13, the estimator being included in the handheld device.

16. The method of claim 13, further comprising receiving the estimates of the vehicle's speed from the speed sensor.

17. The method of claim 16, the speed sensor being mounted in the vehicle.

18. The method of claim 13, further comprising receiving the inertial navigation estimates from the inertial sensors.

19. The method of claim 18, the inertial sensors being mounted in the vehicle.

20. The method of claim 13, further comprising accumulating a track of the vehicle's recent positions.

21. The method of claim 20, further comprising fitting the track to the map data to estimate the vehicle's position.

22. The method of claim 13, the map-match feedback messages further including the snap distance from the position of the vehicle to a nearest road.

23. The method of claim 13, the map-match feedback messages further including Boolean flags to indicate when the vehicle is in a tunnel or not on a road.

24. The method of claim 13, the estimator updating sensor bias estimates based on information in the map-match feedback messages.

* * * * *